(12) United States Patent
Brouns

(10) Patent No.: US 12,344,562 B2
(45) Date of Patent: Jul. 1, 2025

(54) METHOD FOR ADHERING TO FRESH CONCRETE TEMPERATURES

(71) Applicant: L'Air Liquide, Société Anonyme pour l'Etude et l'Exploitation des Procédés Georges Claude, Paris (FR)

(72) Inventor: Marcel Brouns, Kempen (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 845 days.

(21) Appl. No.: 17/606,108

(22) PCT Filed: Apr. 24, 2020

(86) PCT No.: PCT/EP2020/061542
§ 371 (c)(1),
(2) Date: Oct. 25, 2021

(87) PCT Pub. No.: WO2020/216940
PCT Pub. Date: Oct. 29, 2020

(65) Prior Publication Data
US 2022/0194866 A1 Jun. 23, 2022

(30) Foreign Application Priority Data
Apr. 25, 2019 (DE) .................... 10 2019 110 657.5

(51) Int. Cl.
| | | |
|---|---|---|
| C04B 40/00 | (2006.01) | |
| B28C 5/46 | (2006.01) | |
| B28C 7/00 | (2006.01) | |
| B28C 7/02 | (2006.01) | |
| C04B 28/02 | (2006.01) | |

(52) U.S. Cl.
CPC .......... *C04B 40/0075* (2013.01); *B28C 5/468* (2013.01); *B28C 7/0038* (2013.01); *B28C 7/02* (2013.01); *C04B 28/02* (2013.01); *C04B 40/0032* (2013.01)

(58) Field of Classification Search
CPC ... C04B 40/0075; C04B 40/0032; B28C 7/02; B28C 7/0038
See application file for complete search history.

(56) References Cited

U.S. PATENT DOCUMENTS

| | | | | |
|---|---|---|---|---|
| 6,036,352 | A | * 3/2000 | Sakamoto | ............. B28C 5/4203 366/24 |
| 2004/0050301 | A1 | * 3/2004 | Lindner | ............. C04B 40/0683 106/713 |
| 2009/0231950 | A1 | * 9/2009 | Spagnolo | ............. B28C 5/4203 366/24 |

FOREIGN PATENT DOCUMENTS

| | | |
|---|---|---|
| CN | 203376654 | 1/2014 |
| CN | 103676997 | 3/2014 |
| CN | 105045307 | 11/2015 |

(Continued)

OTHER PUBLICATIONS

International Search Report and Written Opinion for corresponding PCT/EP2020/061542, Aug. 20, 2020.

*Primary Examiner* — Marc C Howell
(74) *Attorney, Agent, or Firm* — Elwood L. Haynes

(57) ABSTRACT

Method and installation (100) for providing a batch of fresh concrete having a temperature in a predetermined temperature range at a remote point of use, whereby a control unit (140) controls at least one step of cooling of cement and/or aggregate and/or mixing water before mixing and/or of the fresh concrete, during the production of the batch.

15 Claims, 2 Drawing Sheets

(56) References Cited

FOREIGN PATENT DOCUMENTS

| DE | 100 54 563 | 5/2002 |
| DE | 101 31 838 | 1/2003 |
| DE | 10 2005 037080 | 2/2007 |
| DE | 10 2006 047 261 | 4/2008 |
| EP | 1 749 767 | 2/2007 |

* cited by examiner

METHOD FOR ADHERING TO FRESH CONCRETE TEMPERATURES

CROSS-REFERENCE TO RELATED APPLICATIONS

This application is a 371 of International Application No. PCT/EP2020/061542, filed Apr. 24, 2020, which claims priority to German Patent Application No. DE 10 2019 110 657.5, filed Apr. 25, 2019, the entire contents of which are incorporated herein by reference.

BACKGROUND

The invention relates to a method and a corresponding installation for preparing and supplying fresh concrete.

Concrete is typically a mixture of cement, which functions as binder, a rock, sand and/or gravel fraction as aggregate, mixing or make-up water and optionally further additives by means of which various properties of the concrete can be influenced.

The mixing water induces the exothermal chemical process of setting, i.e. the curing of the concrete mixture.

The pourable initial concrete mixture is referred to as fresh concrete, while the cured concrete is referred to as set or hardened concrete.

The properties of the set concrete depend firstly on the nature and the proportions of the ingredients of the mixture, i.e. on the cement fraction, on the aggregate fraction, on the mixing water fraction and on any additives present.

The properties of the set concrete also depend on the temperature of the concrete prior to and during curing.

Low temperatures have a retarding action in respect of curing, while high temperatures accelerate curing of the concrete. At temperatures below 0° C., ice may form in the fresh concrete. On the other hand, if the temperature of the fresh concrete during curing are too high, the strength of the cured concrete will be reduced.

It therefore has to be ensured that the temperature of the pourable fresh concrete before it is introduced into the shuttering, i.e. into the casting mould, is within a prescribed temperature range and, in particular, that it does not exceed a prescribed maximum temperature. Cooling may be necessary for this purpose.

EP 1 749 767 A2 describes a method and a corresponding apparatus for cooling cement in a transport facility and before cement is added as binder to the mixture, whereby the pulverulent cement is surrounded by a jet of cooling medium, for example nitrogen, as it enters a mixing/storage silo. The pulverulent cement then mixes with the cooling medium, so that the cooling medium cools the cement. In this way, a constituent of the fresh concrete, namely the cement, is cooled before mixing, so that the temperature of the fresh concrete can be reduced thereby. Since the proportion of cement in the concrete is limited, the maximum possible temperature decrease is correspondingly limited.

DE 102006047261 A1 discloses the use of a fluidizing screw cooler for a substream of the aggregates, with the fluidizing screw cooler being cooled by means of liquid nitrogen so that the aggregate conveyed through the fluidizing screw cooler is cooled therein before the aggregate is added to the fresh concrete, Since in this case too, only a proportion of the fresh concrete is cooled, the temperature decrease which can be achieved thereby is likewise limited.

It is likewise known to cool the mixing water before it is mixed with the other fresh concrete constituents in order to reduce the temperature of the fresh concrete mixture. It is furthermore known from DE 10054563 A1 that mixing water can be added in the form of ice or snow to the mixer in order to cool the mixture.

It is likewise known that fresh concrete can be cooled by adding liquid nitrogen (LIN) to the fresh concrete in a vehicle with which the fresh concrete is transported. This method is flexible and has only a small influence on the composition of the fresh concrete mixture.

Each of the above-described methods make it possible to reduce the temperature of the fresh concrete mixture. However, each method also has its limitations regarding cooling capacity, cooling time required and costs.

SUMMARY

It is an aim of the present invention, to provide an optimized method for ensuring the supply of fresh concrete at a temperature within a prescribed temperature range.

Thereto, the present invention proposes a method as defined in claim 1 and an installation adapted for use in said method as defined in claim 13. Specific embodiments of the method and installation according to the invention are described in the respective dependent claims.

The present invention thus relates to a method for providing a batch of fresh concrete at a point of use. Said method includes the step (step a)) of producing fresh concrete by mixing an amount of cement, an amount of aggregate, an amount of mixing water and optionally an amount of one or more additives at a first location. In order to lower the temperature of the fresh concrete thus obtained, one or more of the following cooling steps (collectively referred to as step b)) are performed at said first location:
   i) coding the cement before mixing,
   ii) cooling the aggregate before mixing,
   iii) cooling the mixing water before mixing,
   iv) cooling the fresh concrete during mixing and/or in a vehicle with which the fresh concrete is to be transported.

Examples of such cooling steps suitable for use in the method according to the invention and equipment for same are known in the art.

The choice of the cooling steps available at the first location typically depends on equipment and operation costs, the available space for installing such equipment at the first location and the degree of cooling and flexibility required.

The fresh concrete is then transported (step c)) by means of the vehicle along a route from the first location to a second location, where the fresh concrete is supplied to its point of use (step d)).

Again, any type of vehicle suited for the transport of fresh concrete over land or water may be used, the most commonly used vehicle being a rotating-drum transport truck.

The point of use is typically the site where the concrete is cast in situ. However, the point of use may also be a site for casting prefabricated concrete elements.

In accordance with the present invention, the one or more cooling steps of step b) are controlled by an automatic control unit.

Said automatic control unit comprises a data storage unit in which sets of data collected during previous performances of steps a) to d) are stored. Such a set of collected data typically includes fresh concrete temperatures collected at least two different locations on the route from the first location to the second location.

According to the present invention, the control unit controls the one or more cooling steps b) in such a way that, when the fresh concrete is supplied in step d), the supplied fresh concrete has a temperature within a predetermined temperature range.

The control unit does so on the basis, on the one hand, of the data sets stored in the data storage unit and, on the other hand of one or more input parameters selected from:

the length of the route to be travelled by the vehicle between the first location and the second location in step c), the expected transport time of the vehicle in step c) along the route between the first location and the second location, the expected time lapse between the start of the transport of step c) and the supply of the fresh concrete in step d), for example when, for logistic on-site reasons, a specific supply time has been agreed, regardless of the actual transport time, and the actual and/or forecast weather conditions at the first location and/or along the route between the first and the second location and/or at the second location during step c).

On the basis of the input parameter(s) and the data sets in the data storage unit, it is possible to determine the temperature which the fresh concrete must have at the start of transport step c) in order for said fresh concrete to arrive at the second location, respectively at its point of use with a temperature situated in the predetermined temperature range.

In accordance with the present invention, on the basis of the one or more input parameters and of the data sets in the data storage units, the control unit of the installation controls the one or more cooling steps of step b), so that the fresh concrete effectively presents, at the start of transport step c), this temperature as determined by the control unit It is indeed not sufficient to conduct the cooling steps of step b) so that fresh concrete is produced with a temperature in the prescribed predetermined temperature range, as the temperature of the fresh concrete supplied at the second location does not necessarily correspond to and typically differs from the temperature of the fresh concrete at the first location at the start of transport step c). The fresh concrete must thus be made available at the first location at a temperature which will take into account the temperature changes to which the fresh concrete will be subjected during transport.

In accordance with the present invention, the use of the one or more cooling steps is optimized in that the control unit takes the one or more input parameters, which are correlated with the temperature changes during transport, into account when controlling the cooling steps of step b).

The weather conditions during transport step c) are, for example, a first such parameter correlated with changes in the fresh concrete temperature. In particular, high ambient temperatures cause the fresh concrete to warm up during transport and up to its supply at the point of use, whereas low ambient temperatures help to keep the fresh concrete temperature low or may even cause the fresh concrete to cool down between the first and the second location. Actual measurements and/or weather forecasts may be used as input parameters for the weather conditions.

The longer the transport route or the longer the transport time or the time between the beginning of the transport and the supply of the fresh concrete at the point of use, the higher the impact of the ambient weather conditions on the temperature of the fresh concrete. The length of the route to be travelled is an obvious factor as regards transport time.

Travel forecasts are a useful tool in determining the expected transport time of the vehicle along the route.

In addition, when, as is frequently the case, the fresh concrete is transported in an agitated reservoir of the transport vehicle, for example the rotating drum of a transport truck, the friction caused by said agitation heats the fresh concrete during transportation and the longer the route or the transport time, the higher the global amount of heat of friction generated.

Each of the listed input parameters is thus correlated with the temperature changes the fresh concrete may undergo between the start of its transport and its supply at the point of use.

By taking one or more of said input parameters into account when automatically controlling the cooling steps of step b), the present invention allows the use of said cooling steps to be optimized and thus the cooling costs and/or time to be reduced.

Whereas each of the listed input parameters is thus correlated with temperature changes of the fresh concrete, it may not be necessary to use all of said parameters as input parameters.

For example, if no transport delays, such as traffic jams, are likely, transport distance, rather than transport time, may be sufficient for the optimization process.

Similarly, when, in the case of a major construction work, the transport distance between the first and the second location is constant, the transport distance will not be required as an input parameter if the stored data sets relate to transports over the same distance/along the same route.

When the fresh concrete is to be supplied at the point of use at an agreed moment in time, regardless of when the vehicle arrives at the second location, it may be sufficient to take into account the time difference between the start of transport and the time of supply.

Finally, in areas or during periods of largely constant weather conditions, the actual measured or forecast weather conditions during transport step c) may be without importance, in particular when the stored data sets relate to data collected under similar weather conditions.

Which cooling steps are used in step b) depends in the first place on the cooling equipment available at the first location. The best optimization can be achieved with a wide variety of available cooling steps. However, the method according to the present invention is also advantageous when only a single cooling step, such as the cooling by introducing a cooling agent into the mixer or in the transport vehicle containing the fresh concrete, or only two cooling steps are available at the first location.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
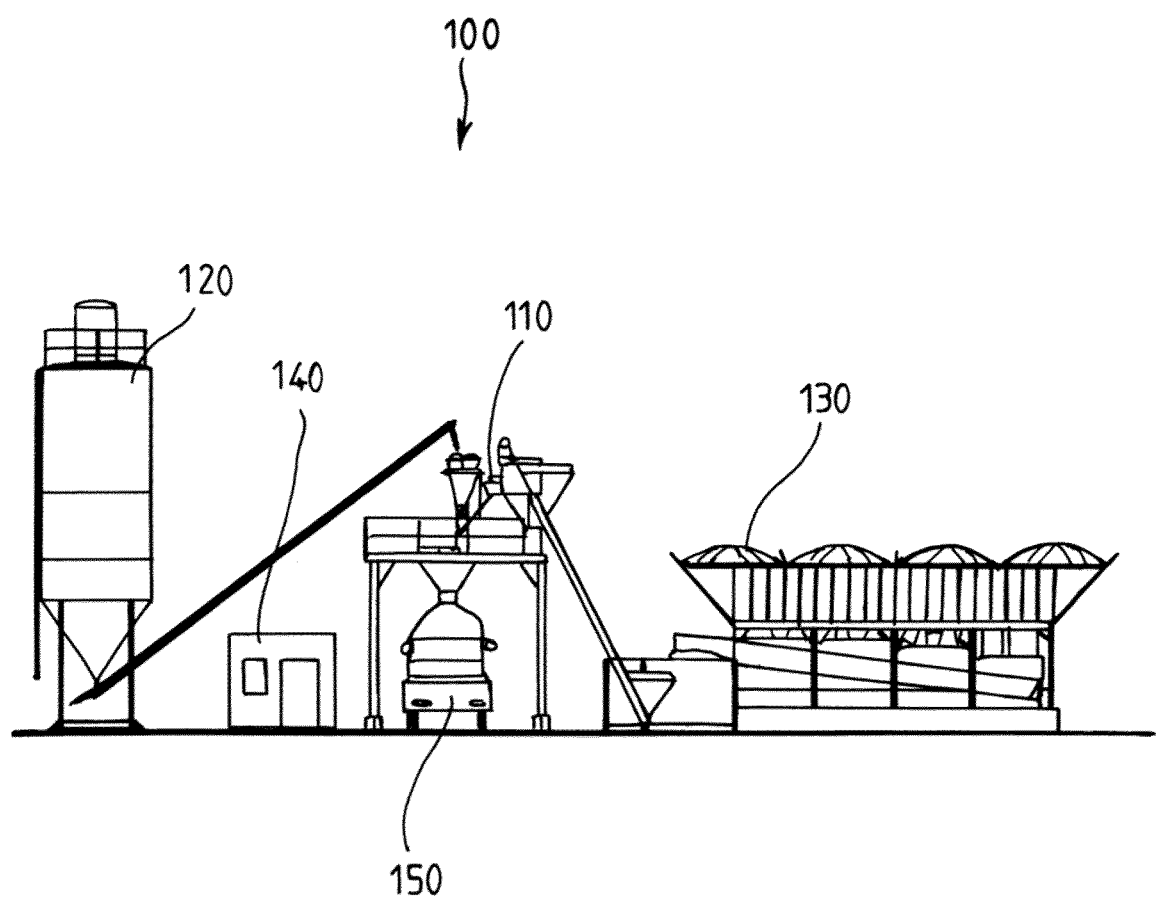
FIG. 1 is a schematic representation of an installation for producing fresh concrete at the first location.

FIG. 1 schematically represents an installation 100 for producing fresh concrete to which the method of the invention may be applied. The installation 100 comprises a mixer 110, which receives cement from silo 120, aggregate from storage facility 130 and also mixing water from a water supply (not shown). The supply (timing and quantities) of cement, aggregate, mixing water and optionally further additives to mixer 110 are controlled by control unit 140. Control unit 140 comprises a data storage unit (not shown), for example in the form of a database. It will be appreciated that said database may be physically located within or attached to control unit 140, but may also be a remote database, for example a cloud-based database.

The installation comprises one or more cooling devices (not shown in FIG. 1) suitable for lowering the temperature of the fresh concrete produced in mixer 110, by cooling the fresh concrete or by cooling ingredients before they are supplied to mixer 110.

For example, silo 120 may be equipped with a cement cooling device, storage facility 130 may be equipped with an aggregate cooling device, the water supply may be equipped with a water cooling device, any additional additive supply equipment may likewise be equipped with an additive cooling device and mixer 110 may have a cooling device for cooling the fresh concrete inside the mixing space of the mixer. The installation may also comprise a cooling device for cooling the fresh concrete inside the vehicle 150 to which the fresh concrete is transferred for transport. Due to the relative low proportion of the further additives, separate cooling of the additives will generally be less effective and a cooling device for cooling said additives may generally be omitted.

Suitable cooling devices are known in the art and the present invention is not limited to specific types of cooling devices.

Preferred cooling devices for mixer 110 and transport vehicle 150 cool the fresh concrete through the addition of a cryogenic medium, such as, for example, liquefied nitrogen.

Control unit 140 is communicatively connected to the cooling devices present in order to regulate and control the cooling of the corresponding media and thus indirectly or directly to control the temperature of the fresh concrete produced.

For the control of the one or more cooling steps, the installation is typically equipped with one or more monitoring devices (not shown), in particular with one or more temperature sensors. Thus, silo 120 may have a measuring sensor for determining the temperature of the cement. If the installation comprises a cement cooling device, which is used to cool the cement inside silo 120, said measuring sensor will detect the temperature of the cooled cement. If the cement cooling device cools the cement downstream of the silo, a measuring sensor may be used to determine the temperature of the cement upstream of the cooling device, a measuring sensor may be used to determine the temperature of cement cooled by means of the cement cooling device, or (separate) measuring sensors may be used to determine the temperature of the cement both before and after cooling. Even if no cement cooling device is present, the detected cement temperature may be useful information in order to help determine the degree of cooling required by the one or more other cooling devices of the installation.

Storage facility 130 may likewise have one or more measuring sensors for measuring the temperature of the aggregate, whereby the comments presented above with respect to the measuring sensor(s) and the cooling device for the cement in/from silo 120 also apply to the measuring sensor(s) and the cooling device for the aggregate in/from storage facility 130.

The mixing water supply is likewise advantageously equipped with one or more measuring sensors as described above with respect to cement. It may in this respect be pointed out that, as water is a fluid, it is generally relatively easy to measure and regulate the temperature of the mixing water.

Mixer 110 may likewise be equipped with a measuring sensor for measuring the temperature of the fresh concrete in the mixing space. Such a measuring sensor may be used to determine the temperature of the fresh concrete at any moment during the mixing process. Thus, if mixer 110 is equipped with a cooling device for cooling the fresh concrete in the mixing space, the measuring sensor may be used to determine the temperature of the fresh concrete before, during and after cooling.

Figure 2:
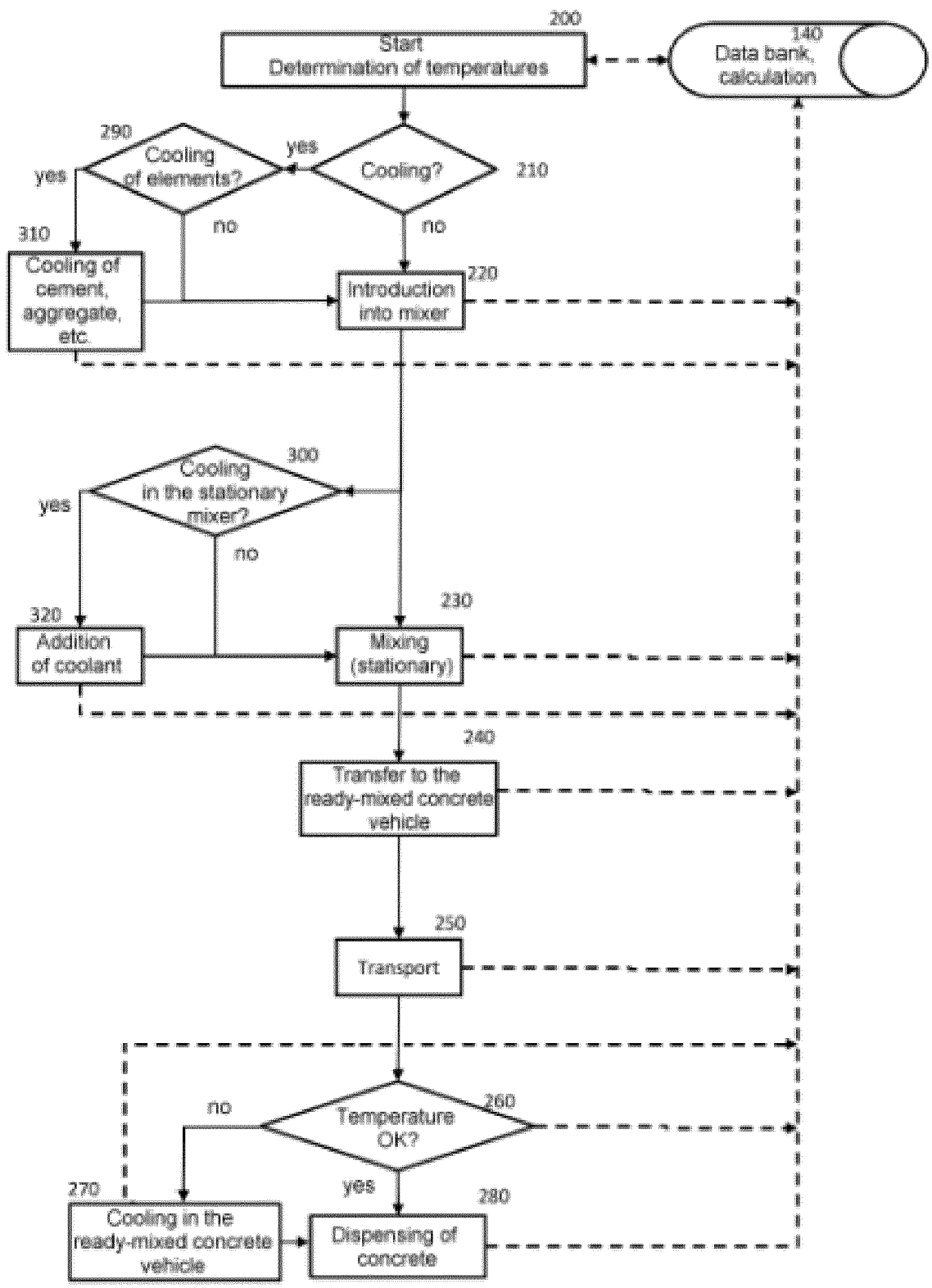
FIG. 2 is a schematic flow diagram of the steps of a possible decision-making process by the control unit.

From mixer 110, the fresh concrete is transferred to one or more transport vehicles. FIG. 2 shows a rotating-drum concrete truck 150.

One or more measuring sensors may be present for detecting the temperature of the fresh concrete inside the vehicle. Such a measuring sensor may be a stationary temperature sensor, which remains at the first location, or a mobile temperature sensor connected to and moving with vehicle 150. A combination of such measuring sensors may also be used. Again, if installation 100 is equipped with a cooling device for cooling the fresh concrete inside the vehicle, such a measuring sensor may be used to determine the temperature of the fresh concrete before, during and after cooling.

In accordance with the present invention, the above-mentioned measurement sensors are communicatively connected to control unit 140. In other words, control unit 140 receives the measurement data from the different sensors.

Suitable measurement sensors are known in the art and the present invention is not limited to a particular type of sensor. Similarly, systems for continuous or intermittent communication between sensors and control units and which may be used in the context of the present invention are known in the art.

Control unit 140 uses the received data in order to regulate the cooling step or steps of step b) and preferably also to verify the correct performance of the one or more cooling steps.

For example, when control unit 140 receives from a measurement sensor the temperature of a medium to be cooled, control unit 140 determines, on the basis of said temperature, the amount of cooling to which said medium must be subjected by the corresponding cooling device. When control unit 140 receives from a measurement sensor the temperature of a medium while it is subjected to a cooling step, control unit 140 uses the received temperature in order determine the termination of said cooling step. When control unit 140 receives from a measurement sensor the temperature of a medium which has been cooled, preferably in combination with the temperature of the medium before cooling, control unit 140 verifies whether the cooling step was effective and if necessary adjusts the regulation of said cooling step.

In addition, control unit 140 can also use received measurements regarding the temperature of ingredients before their introduction into mixer 110, and this regardless of whether said ingredients have previously been cooled, in order to determine the degree of cooling required for the fresh concrete, whether in the mixing space of mixer 110 and/or in transport vehicle 150, and thus to control the corresponding cooling devices and steps.

Similarly, control unit 140 may use received measurements regarding the temperature of the fresh concrete produced in mixer 110 in order to determine the cooling to which the fresh concrete must be subjected in transport vehicle 150 and thus to control the corresponding cooling device so that the fresh concrete in vehicle 150 has the required temperature at the start of its transport.

It may again be pointed out that additional sensors may be present and that not all of the above-described sensors may be necessary.

For example, as mentioned before, control unit 140 may control the cooling step of a medium only on the basis of the temperature of the medium prior to cooling or only on the basis of the temperature of the medium after cooling.

According to a particularly basic embodiment, control unit 140 uses only the measurement sensor data regarding temperature of the fresh concrete in mixer 110 or in vehicle 150 in order to regulate the cooling step or steps of step b) so that the fresh concrete has the required temperature at the start of its transport. In that case, the cooling steps of step b) are typically, but not necessarily, limited to the cooling of the fresh concrete in mixer 110 and/or in vehicle 150. Whereas this embodiment may be easier to put into practice, it typically presents the disadvantage of potentially causing extra delays before the transport step c) may start.

The predetermined temperature range within which the temperature of the fresh concrete must fall when the fresh concrete is delivered at the second location, respectively at the point of use, depends on a number of factors, such as the type of fresh concrete (quick-hardening or slow-hardening), the weather conditions at the second location, the size of the cast (and therefore the amount of heat generated by the setting reaction), the presence of cast cooling means, etc.

In order to avoid the presence of ice lumps in the fresh concrete, the lower limit of the predetermined temperature range is typically above 0° C., preferably not less than 5° C. In order to ensure sufficient strength of the set concrete, the upper limit of said predetermined temperature range is typically not greater than 30° C., preferably not greater than 25° C. and more preferably not greater than 20° C.

According to a preferred embodiment, the method according to the present invention has learning capacity in that new data sets, which become available in the course of the method, are added to the data storage unit and may thus be used by the control unit in the optimization process.

Such additional data sets may be added intermittently or continuously, and preferably, but not necessarily, automatically.

Each data set contains at least two fresh concrete temperatures obtained in the course of a succession of steps a) to d), in particular in the course of steps c) and d), as well as correlating data, such as the distance travelled between the measurements, or, preferably, the time difference between the measurements of these temperatures, the weather conditions at the time of the measurements, etc. Preferably, the data sets contain the same type of data as the input parameters, or data which permit to determine data corresponding to the input parameters. For example, a time difference between two measurements may be derived from a combination of the distance travelled and the speed of travel during transport. GPS systems may be used to provide transport distances and transport times. Weather conditions may be measured (for example by stationary sensors or by sensors mounted on the transport vehicle) or may be downloaded from weather forecasts or weather reports. Additional data which may usefully be included in data sets are concrete batch identification numbers, batch composition data, quantity of fresh concrete in the vehicle, transport vehicle type, etc.

The at least two fresh concrete temperatures of a data set typically include the fresh concrete temperature and the start of transport step c) and the fresh concrete temperature at the end of transport step c), respectively at the time of supply step d). According to an advantageous embodiment, the data set includes intermediate fresh concrete temperatures measured along the route travelled in step c), more preferably, fresh concrete temperature measurements are made all along the route travelled in step c). In that case, the data set also provides information about temperature changes over shorter travel distances or travel times than the complete route travelled in step c). Thereto, the transport vehicle is typically equipped with a suitable automatic sensor.

The control unit may thus receive temperature values for the fresh concrete in the transport vehicle at the start of transport, during transport to the second location and the point of use and also at the point of use, and likewise correlated data values, in particular regarding the ambient temperature surrounding the vehicle and the duration of transport from the fist location to the second location and the point of use. The data set obtained with a particular batch of fresh concrete is supplied to the control unit 140 for storage in the data storage unit.

The control unit can thus access a plurality of stored data sets related to previously produced batches of fresh concrete, and determine the most suitable cooling steps and/or the required degree(s) of cooling for a new batch of fresh concrete on the basis thereof, while taking into account i) the current data, such as temperatures of the cement, the aggregate and of the water and ii) input data, such as the external temperatures, the envisaged transport time, etc.

In particular, the accuracy with which the control unit determines the most suitable cooling steps and/or the required degree(s) of cooling for a new batch of fresh concrete is thus improved with the aid of the additionally stored data.

This embodiment of the method according to the invention, whereby data regarding the temperature of the fresh concrete during new transport steps c) and at the time of delivery (step d)) are added to the data storage unit, thus implements a feedback loop, whereby the additional data are used for future fresh concrete batches.

An example of the manner in which control unit 140 controls the one or more cooling steps is schematically illustrated in FIG. 2.

A batch of fresh concrete here refers to a quantity of fresh concrete produced in a mixing operation at the first location.

It is planned that the first vehicle with fresh concrete will leave the first location at time t0.

The thus produced fresh concrete must be supplied at its point of use at the second location with a temperature Tf situated within a predetermined temperature range RTf determined by the construction supervisor.

Control unit 140 determines the expected transport time of the vehicle between the first and the second location. Depending on the means of transport, the travel time may be determined by a transport schedule, the distance, or both the chosen route and traffic conditions.

For example, in the case of transport by means of a rotating-drum concrete truck 150 and if no traffic delays are to be foreseen, control unit 140 may determine the transport time based on the transport distance and the average travel speed of a transport truck 150. If, on the other hand, traffic density or road works may be a significant factor affecting the transport time, control unit 140 may transmit the coordinates of the first and second location and the departure time t0 to an on-line GPS-based traffic prediction site and download the preferred travel route, its length and the predicted travel time.

Simultaneously, control unit 140 downloads the expected weather conditions during transport step c), in particular the temperature(s), from an on-line weather forecast system. Where reliable weather forecasts are not available, control system 140 may also use recently collected weather data or long-term weather-condition averages for the area and date concerned.

The data storage unit of control system 140 contains data sets obtained during previous runs of process steps a) to d), whereby a transport vehicle 150 of the same type was used for transport step c).

With the thus obtained transport time and weather conditions as input parameters/data and by means of data interpolation with the data sets stored in the data storage unit, control unit 140 determines the required temperature T0 or the temperature range RT0 of the fresh concrete at the start of transport step c), with which the fresh concrete will arrive at its point of use with a temperature Tf within the predetermined temperature range RTf.

Control unit 140 then controls the one or more cooling devices of the installation 100 so that a batch of fresh concrete is produced with a temperature T0 or a temperature within the range RT0 at the start of transport step c).

For example, temperature T0 or temperature range RT0 of the fresh concrete at start of transport step c) may be determined by control unit 140 based on the n data sets in the data storage unit with the lowest deviation as regards the input parameter(s), whereby n is any digit from 1 to 10, preferably from 2 to 8, more preferably 3 to 6. Suitable software for determining the least deviating data set or sets as well as software for determining an optimum value by means of correlation between multiple selected data sets are known in the art.

Alternatively, control unit 140 may use a numeric model, generated, by a known numeric modelling process, on the basis of the stored data sets to determine the temperature T0 or the temperature range RT0 of the fresh concrete at the start of transport step c). In that case, the numeric model is preferably updated when one or more further sets of data collected during steps a) to d) of the method are stored in the data storage unit.

If without any cooling steps, the temperature of the fresh concrete at the start of transport step c) falls within the temperature range RT0 determined by control unit 140, control unit 140 does not activate any of the cooling devices present. In such a case, the data collected by the various measurement sensors, as well as data regarding travel time and weather conditions, regardless of whether these data were collected by sensors or obtained by other means (see above), are merely stored in the data storage unit for future use by control unit 140.

If without any cooling step b), the temperature of the fresh concrete at the start of transport step c) would fall outside temperature range RT0 determined by control unit 140, control unit 140 controls the one or more cooling steps of step b) so that at least one cooling step takes place and a fresh concrete temperature at the start of transport step c) within determined temperature range RT0 is obtained.

Depending on the complexity of cooling step b), the control of said cooling step b) by control unit 140 may be relatively straightforward.

For example, when the only cooling method available in cooling step b) is the cooling of the fresh concrete in mixer 110 or in vehicle 150, the control unit controls said cooling step by activating said cooling step and maintaining said cooling step active until the temperature T0 of the fresh concrete at the start of transport step c) lies within the temperature range RT0 determined by control unit 140.

Whereas, when only one or two cooling steps are available in step b), the control of said cooling by control unit 140 is quite straightforward, such cooling may entail disadvantages such as slowness or relatively high costs.

As indicated earlier, merely cooling one of the ingredients upstream of mixing step a) may not be sufficient in order to obtain a fresh concrete temperature T0 within the determined range RT0. Certain cooling steps, such as the bulk cooling of cement inside silo 110, present the disadvantage of lacking flexibility in that the cement temperature cannot be modified at short notice.

It may thus be advantageous to combine multiple cooling steps in step b), said multiple cooling steps being controlled by control unit 140 so as to provide an optimized use of the combined cooling steps and, naturally, so as to reach a temperature T0 within range RT0.

As explained earlier the temperatures measured by the measuring sensors of installation 100 are transmitted to control unit 140. In FIG. 2, the respective data transmissions are shown schematically by dashed arrows.

In the illustrated embodiment, the method commences, see step 200, with the determination of the temperatures of all essential constituents, which will form the fresh concrete. For this purpose, the respective temperature of the cement, of the aggregate and of the mixing water and optionally of further additives is determined and transmitted to control unit 140, so that control unit has the information about the current temperatures of all constituents of the mixture before mixing. Furthermore, control unit 140 has been informed of the predetermined desired temperature Tf or of the predetermined permissible temperature range Rtf of the fresh concrete at the point of use and also of the exterior temperature conditions along the scheduled transport route to the point of use. Based on at least these data, the control unit determines the appropriate temperature T0 or temperature range TR0 and thus whether a cooling step b) is necessary. When concrete is produced in batch operation, also known as batch process, control unit 140 determines for each individual batch whether cooling is necessary.

If cooling is necessary, control unit 140 checks whether cooling of one or more of the ingredients of the fresh concrete, i.e. essentially the cement, the aggregate and the mixing water, and/or of the mixed fresh concrete is necessary for the temperature of the batch at the start of transport step c) to correspond to determined value T0 or to fall within determined temperature range RT0 so that the temperature Tf of the batch at the point of use will fall within predetermined range RTf.

For the selection of the cooling steps to be applied and the control of the cooling steps to be used, control unit 140 takes into account factors such as the flexibility of the individual cooling steps (time delays), the maximum contribution of each cooling step to the temperature reduction of the fresh concrete (for example in the light of the fraction of said ingredient in the fresh concrete) and costs of the individual cooling steps (energy, cooling agent . . . ).

Typically, control unit 140 selects the most economical combination of cooling steps, which will not cause a delay of the scheduled start of transport step c).

When the method comprises cooling steps which are/may be performed in succession, for example cooling of cement and cooling of mixing water or cooling of ingredients and cooling of the fresh concrete mixture, control unit 140 preferably controls the successive cooling steps in an iterative manner. In this manner, for example, the subsequent cooling steps can be controlled while taking into account any differences between the intended degree of cooling and the actual degree of cooling achieved in the preceding cooling step(s) or any changes in the ambient conditions (e.g. outside temperature).

Such a preferred embodiment is described below with reference to FIG. 2.

In the process for producing a batch, every decision as to whether, and if so to what extent, cooling is required can in each case be made taking into account data stored in the data storage unit of control unit 140, which relate to one or more comparable batches produced earlier.

Said data related to earlier batches as stored in the data storage unit of control unit 140 typically include the respective amounts and temperatures of the cement, of the aggregate and of the mixing water before their introduction into mixer 110, the temperature of the batch of fresh concrete after mixing in mixer 110, and the temperature of the fresh concrete at the start of transport step c), whereby the temperature of the fresh concrete after mixing in the mixer and the temperature of the fresh concrete at the start of its transport may be identical or different. As indicated earlier, the data storage unit typically also comprises the following data regarding the transport and supply of the previously produced batch of fresh concrete: the actual duration of transport along the route from the first location to the second location, respectively up to the supply at the point of use, the ambient temperature at different locations of said route and the temperature of the concrete at the point in time of its delivery at the point of use.

For control unit 140 to determine whether cooling is necessary in order to deliver the fresh concrete at the point of use at the predetermined required temperature Tf or within the predetermined range RTf, control unit 140 may select comparative data set(s), related to an earlier production batch(es) stored in the data storage unit, to be used as reference/comparison. The decision whether cooling is necessary or whether the planned cooling step(s) is/are sufficient, can be checked and possibly adjusted on the basis of the comparative data set(s) used. By way of comparative data set, a data set is typically selected which is closest, i.e. as similar as possible, in respect of the volume of the fresh concrete batch, in respect of the measured temperatures of the cement, the aggregate and water and also the desired temperature of the fresh concrete at the point of use and in respect of the ambient temperature and also the envisaged duration of transport. Alternatively the control unit may select by way of comparative data set, a stored data set which is closest, i.e. as similar as possible, in respect of the volume of the fresh concrete batch, in respect of the measured temperatures of the cement, the aggregate and water and the determined desired temperature T0 or temperature range RT0 of the fresh concrete at the start of transport step c).

On the basis of the comparative data set(s) selected, control unit 140 decides whether and if appropriate to what extent one of the cooling steps available for achieving the desired temperature T0 of the fresh concrete is carried out, If control unit 140 determines in step 210 that cooling is required, control unit 140 next determines in step 290 whether cooling of one or more of the ingredients, i.e. of at least one of the cement, the aggregate and the mixing water, should take place in step 310 before said ingredients are introduced into the stationary mixer 110 in step 220 and mixed there in step 230.

In step 310, control unit 140 determines whether cooling of the mixture in stationary mixer 110 is to be performed. If this is the case, control unit 140 controls the corresponding cooling device so that step 320 is executed.

The temperature of the batch of fresh concrete, i.e. the mixture, in mixer 110 can optionally be determined, communicated to control unit 140 and added to the data set to be stored in the data storage unit.

After mixing in stationary mixer 110, the fresh concrete is transferred to a transport vehicle 150 of its transport to the point of use. In the embodiment illustrated in FIG. 1, transport vehicle 150 is a ready-mix concrete transport truck 150.

Although not illustrated in FIG. 2 and depending on the cooling devices available in the installation, control unit 140 may also determine whether cooling of the fresh concrete in vehicle 150 is to be performed at this stage (instead of or in addition to cooling of the mixture in stationary mixer 110). If this is the case, control unit 140 controls the corresponding cooling device so that cooling of the fresh concrete in vehicle 150 takes place.

The temperature of the fresh concrete may be determined, see method step 260, at any point during transport 250 and at the point in time of delivery at the second location. Such temperatures are transmitted to control unit 140 and included in the data set of the batch concerned for subsequent storage in the data storage unit.

Should the temperature of the fresh concrete at the point of use be above predetermined temperature Tf or above predetermined temperature range RTf, additional cooling of the batch of fresh concrete in vehicle 150 may be performed, if corresponding cooling equipment is available at the location. Such cooling 270 of the batch of fresh concrete can be brought about in the mixing drum of the ready-mixed concrete vehicle 150 by addition of an amount of coolant, in particular liquid nitrogen. In a particular embodiment, the ready-mix concrete vehicle 150 can itself have an appropriate device for the transport and introduction of the coolant into the mixing drum, so that the fresh concrete can be cooled to the predetermined temperature Tf or to a temperature within predetermined range RTf shortly before dispensing of the fresh concrete at the point of use.

Although such cooling of the fresh concrete at the second location may be conducted independently, i.e. not under the control of control unit 140, according to a preferred embodiment, control unit 140 is also in communication with and controls the cooling of the fresh concrete in vehicle 150 at the second location/at the point of use.

If such additional cooling is available at the second location, this may also be taken into account by control unit 140 for the determination of temperature T0 or temperature range RT0 at the start of transport step c).

For example, if the transport time and/or the weather conditions are such that, without additional cooling at the second location, a temperature T0 or range RT0 at the start of transport step c) would be required which cannot be achieved with the cooling equipment at the first location or which would be too expensive or time-consuming to realize at the first location, the availability of additional cooling at the second location allows control unit 140 to determine a higher temperature T0 or range RT0 at the start of transport at the first location and provide for additional cooling of the fresh concrete upon arrival at the second location, so that the fresh concrete is still supplied at the predetermined temperature Tf or temperature range RTf at its point of use. The availability of additional cooling at the second location also makes it possible to compensate for factors which control unit 140 could not take into account, such as additional transport delays due to technical failure of the vehicle or traffic jams caused by unpredicted events or sudden changes in the weather conditions.

The total cooling necessary for a desired temperature of a batch of fresh concrete at its point of use can thus be distributed over a plurality of cooling steps. In particular, cooling can be optimized in respect of the consumption of coolant, energy consumption and time constraints.

As indicated earlier, cooling step b) may include cooling of one or more solid ingredients, i.e. of the cement and/or an aggregate.

Methods for cooling the cement are known from the prior art, for example from DE102005037080A1 in which the cement is brought into contact with a cooling medium during transport from the point of storage, for example from a silo, to the stationary mixer, for example by mixing the cement with the cooling medium by means of a two-fluid nozzle. The temperature of the cement can be determined before the cooling operation and the amount of coolant used can be set accordingly. Furthermore, the temperature of the cement can be determined after the cooling operation and transmitted to the control unit 140, so that the temperature of the cooled cement can be taken into account in the subsequent method steps.

The aggregate, typically sand or gravel or similar material, can be cooled with methods and apparatuses, which are customary for this purpose, being able to be used. Thus, a fluidizing screw cooler or a fluidized-bed reactor can be used for the cooling of sand or gravel. After cooling of the aggregate, the temperature thereof is preferably determined and communicated to control unit 140, so that control unit 140 can take the temperature of the aggregate as introduced into the stationary mixer into account for controlling the further method steps.

As also indicated earlier, cooling step b) may include cooling of the mixing water. For this purpose, the installation may have a measuring instrument for determining the temperature of the mixing water prior to possible cooling and a transmitter for transmitting a determined temperature of the mixing water to control unit 140. The cooling of the mixing water can be brought about using apparatuses and methods known per se, for example by means of an open or closed refrigeration circuit, The method may also include and the installation may also be configured for determining the temperature of the mixing water after cooling and for communication of said temperature to control unit 140, so that the actual temperature of the cooled mixing water can also be taken into account by control unit 140 in the subsequent method steps for controlling the temperature of the fresh concrete.

Likewise, any additive, for example concrete plasticizers or fluidizers or accelerators or retarders, etc., which is added to the mixture during mixing in the stationary mixer can be cooled before addition or introduction into the mixer 220, and in all cases the temperatures of the added concrete additive are preferably determined before addition to the other ingredients, said temperature being transmitted to control unit 140 so that it can likewise be taken into account in the further course of the process.

During mixing, step 230, the temperature of the mixture may be measured continuously or intermittently. The temperature thus determined is transmitted to control unit 140.

During mixing, the mixture can be cooled (further) in stationary mixer 110, in particular by addition of a coolant, see 320, which is or comprises preferably nitrogen, more preferably liquid nitrogen. It should be noted here that cooling of the mixture in mixer 110 must be controlled by control unit 140 so that no elements of the mixer are cooled excessively on introduction of a cryogenic coolant, such as liquid nitrogen. For example, excessive cooling may take place if puddles of liquid nitrogen are formed, and elements of mixer 110 may be damaged as a consequence of sudden and/or very local strong cooling. Although this can be prevented by slowly introducing the liquid nitrogen, the time necessary for this is typically not available in the production of a batch of fresh concrete. Accordingly, the maximum amount of cryogenic coolant, such as liquid nitrogen, which may be added to mixer 110 and/or the rate with which the coolant may be added is limited by control unit 140 in order to prevent damage to mixer 110.

For the control of the one or more cooling steps, control unit 140 can refer to a data set of a batch of fresh concrete produced earlier for every decision, i.e. whether to carry out a cooling step for cooling the cement or the aggregate or the mixing water or cooling during mixing in the stationary mixer. In particular, the control unit can thus have recourse to the data, stored in the data storage unit, from one or more earlier, comparable batches of fresh concrete for which the temperature T0 or the temperature range RT0 at the beginning of transport step c) was comparable.

On the basis of the stored data for one or more earlier comparable batches, control unit 140 can determine whether the temperature of the fresh concrete in mixer 110 is low enough in order to be able to provide the fresh concrete with the predetermined desired temperature Tf or within the predetermined desired range RTf at the point of use. On the basis of the measured current temperature of the batch of fresh concrete in mixer 110 or vehicle 150, control unit 140 determines whether the fresh concrete has to be cooled further in order to compensate for warming during transport in the ready-mixed concrete vehicle 150. If necessary, control unit 140 orders further cooling of the batch of fresh concrete produced, for example by addition of further coolant, such as liquid nitrogen.

The batch of fresh concrete produced in mixer 110 is transferred to vehicle 150, with the temperature of the fresh concrete being measured before introduction, signalled to control unit 140 and added to the data set for the batch of fresh concrete. The constituents with the respective amounts and temperatures and optionally further information, for example as to whether and to what extent the cement or the aggregate or the mixing water have been cooled, are thus stored in the data storage unit for the batch of fresh concrete produced.

The temperature of the batch of fresh concrete in the ready-mix concrete vehicle 150 is preferably measured during transport 250. The corresponding data are communicated to control unit 140. The measured temperature can, in particular, be transmitted to control unit 140 during transport. In that case, and on the basis of the temperature data determined both for the batch of fresh concrete and also the ambient temperature and, in particular, optionally on the basis of stored data for an earlier batch of fresh concrete and the ambient temperatures determined and the remaining envisaged duration of transport, control unit 140 can determine or check, even during transport, whether the temperature of the fresh concrete at the point of use will still be at the predetermined temperature Tf or within the predetermined temperature range RTf at the expected time of delivery.

When the control unit 140 determines on the basis of the continuous temperature measurements for the fresh concrete being transported and also of the ambient temperatures, the remaining duration of transport and optionally taking into account a stored data set for a batch of fresh concrete produced and transported earlier, see step 260, that the temperature of the batch of fresh concrete at the time of delivery is expected to be no longer within the predetermined range or at the predetermined value, the batch of fresh concrete is cooled in the ready-mix concrete vehicle 150 in step 270.

Thereto, vehicle 140 goes to a station, preferably at or near the second location, at which the fresh concrete can be cooled by addition of a coolant, preferably nitrogen and more preferably liquid nitrogen, before reaching the point of use, so that the desired or permissible temperature of the fresh concrete at the point of use is not exceeded. If vehicle 150 is itself equipped with suitable concrete cooling equipment, the additional cooling of the fresh concrete may take place at any location. As indicated earlier, the amount of coolant to be added to the fresh concrete at this stage can be determined by the control unit 140 on the basis of the information available for this batch of fresh concrete, i.e. on the basis of the amount, the current temperature, the ambient temperature, the desired temperature Tf or temperature range RTf, optionally in combination with data from one or more previously stored data sets.

The batch of fresh concrete may thus be cooled in the ready-mix concrete vehicle 150, step 270, using the amount of coolant determined by control unit 140. Thereafter, the fresh concrete is delivered at the point of use, with at least the temperature of the fresh concrete being determined on delivery and transmitted to the control unit 140, so that the data for the batch determined during production and transport can be employed for the production of a future batch of fresh concrete.

As indicated earlier, using several different cooling steps in step b) may have certain advantages, even if the required degree of cooling could be achieved in a single cooling step, This can, for example, be the case when the use of a single cooling step would delay the production process of the batch of fresh concrete. For example, cooling of the mixing water down to a temperature below 0° C. would take considerably longer than cooling to a temperature above the freezing point (0° C.). In addition, ice formation in the mixing water at sub-zero temperatures may cause additional problems (such as blockages) or may require the use of special equipment. In this case, control unit 140 will typically cause cooling to be carried out in multiple cooling steps and accelerate the production process, In many cases, high ambient temperatures in combination with an envisaged long duration of transport, will make cooling in stationary mixer 110 essential. According to an advantageous embodiment of the method according to the present invention, cooling step b) therefore at least includes a step of cooling the fresh concrete in mixer 110.

It should likewise be noted that cooling of the fresh concrete during or in the course of transport step c) may be required in order to delay or prevent the setting process or curing of the fresh concrete during transport, in particular in the case of long transport times at high temperatures. According to a specific embodiment of the method according to the invention, cooling step b) includes a cooling step of the fresh concrete in vehicle 150 during transport step c), for example by means of a cooling station located on or in the vicinity of the transport route or, at any suitable location or during any part of transport step c) by means of cooling equipment present in or on vehicle 150.

LIST OF REFERENCE NUMBERS

100 Installation for producing a batch of fresh concrete
110 Mixer for fresh concrete
120 Cement silo
130 Storage facility for aggregate
140 Control unit
150 Transport mixer, ready-mixed concrete vehicle
200 Start, determination of temperatures
210 Decision: cooling?
220 Introduction into the mixer
230 Mixing in the stationary mixer
240 Transfer to a ready-mixed concrete vehicle
250 Transport of fresh concrete in the ready-mixed concrete vehicle
260 Decision: is temperature permissible?
270 Cooling of the fresh concrete in the ready-mixed concrete vehicle
280 Dispensing of the concrete at the point of use
290 Decision: cooling of the concrete constituents
300 Coding of at least one concrete constituent
310 Decision: coding in the stationary mixer?
320 Addition of coolant

The invention claimed is:

1. A method for providing a batch of fresh concrete at a point of use, the method comprising:
   a) mixing an amount of cement, an amount of aggregate, and an amount of mixing water at a first location so as to produce fresh concrete,
   b) performing one or more of the following cooling steps at the first location:
      i) cooling the cement before mixing,
      ii) cooling the aggregate before mixing,
      iii) cooling the mixing water before mixing,
      iv) cooling the fresh concrete during mixing and/or in a vehicle with which the fresh concrete is to be transported,
   c) transporting the fresh concrete along a route from the first location to a second location by means of the vehicle, and
   d) supplying the fresh concrete to the point of use at the second location, wherein, the one or more cooling steps b) are controlled by an automatic control unit on the basis of:
   i. sets of data collected during previous performances of steps a) to d) and stored in a data storage unit of the control unit, including fresh concrete temperatures collected at at least two different locations on the route from the first location to the second location; and
   ii. one or more of the following input parameters:
      length of the route between the first location and the second location in step c),
      expected transport time of the vehicle along the route between the first location and the second location during step c,
      expected time lapse between start of transport in step c) and time of supply of the fresh concrete in step d),
      actual and/or forecast weather conditions at the first location and/or on the route between the first and the second location and/or at the second location during step c), in such a way that in step d) the fresh concrete has a temperature within a predetermined temperature range.

2. The method according to claim 1, whereby the predetermined temperature range has a lower limit >0° C.

3. The method according to claim 1, whereby the predetermined temperature range has an upper limit≤30° C.

4. The method according to claim 1, whereby a further set of data comprising data collected during the performance of steps a) to d) is generated and stored in the data storage unit.

5. The method according to claim 4, whereby the further set of data includes the temperature of the fresh concrete at the start and at the end of transport step c), and the temperature of the fresh concrete at intermediate points along the route from the first location to the second location.

6. The method according to claim 5, whereby the temperature of the fresh concrete is continuously determined during step c) and included in the further set of data.

7. The method according to claim 1, whereby the control unit determines a temperature T0 or a temperature range RT0 for the fresh concrete at the start of transport step c), which, under conditions corresponding to the input parameter(s), will result in the fresh concrete with a temperature within the predetermined temperature rang in step d).

8. The method according to claim 7, whereby the control unit determines temperature T0 or temperature range RT0:
on the basis of n data sets in the data storage unit with the lowest deviation with respect to the input parameter(s), whereby n is any digit from 1 to 10, or
by means of a numeric model based on the data sets stored in the data storage unit.

9. The method according to claim 1, whereby the control unit determines temperature T0 or temperature range RT0 by means of a numeric model based on the stored data sets and whereby the numeric model is updated when one or several further sets of data are uploaded to the data storage unit.

10. The method according to claim 1, further comprising:
determining a temperature of the amount of cement before mixing, and/or
determining a temperature of the amount of the aggregate before mixing, and/or
determining a temperature of the amount of the mixing water before mixing,
and communicating the determined temperature or temperatures to the control unit.

11. The method according to claim 1, further comprising:
determining a temperature of the fresh concrete in the mixer and/or of the fresh concrete in the vehicle,
communicating the determined temperature or temperatures to the control unit.

12. The method according to claim 1, further comprising cooling the fresh concrete in the vehicle during or after the step of transporting the fresh concrete, but before the step of supplying the fresh concrete to the point of use, said step being controlled by the control unit.

13. An installation for providing a batch of fresh concrete, the installation comprising:
a storage facility for cement, a storage facility for aggregate and a supply of mixing water,
a mixer for mixing at least an amount of cement from the cement storage facility, an amount of aggregate from the aggregate storage facility and an amount of mixing water from the water supply so as to produce fresh concrete,
a vehicle for transporting the produced fresh concrete,
one or more of the following cooling devices:
i) a cooling device for cooling the cement upstream of the mixer,
ii) a cooling device for cooling the aggregate upstream of the mixer,
iii) a cooling device for cooling the mixing water upstream of the mixer,
iv) a cooling device for cooling the fresh concrete in the mixer and/or a cooling device for cooling the fresh concrete from the mixer after said concrete has been transferred into the vehicle,
and
a control unit capable of receiving input parameters and comprising a data storage unit containing data sets with data related to previous batches of fresh concrete produced with the installation, the control unit being programmed and adapted to control the one or more cooling devices of the installation in such a way that fresh concrete is provided at a determined temperature T0 or with a temperature within a determined temperature range in the vehicle.

14. The installation according to claim 13, whereby the control unit is programmed and adapted to determine the temperature T0 or the temperature range which, if the fresh concrete is transported in the vehicle from the installation to a second location in accordance with the input parameters provided to the control unit, will result in a temperature of the fresh concrete at the second location within a predetermined temperature range.

15. The installation according to claim 13, further comprising measuring sensors for collecting data, including temperatures, and communication devices for communicating the measured data to the control unit, the control unit being programmed and adapted to assemble the communicated measured data into data sets and for storing said data sets in the data storage unit.

* * * * *